Oct. 15, 1957  J. H. BOOTH  2,809,855
JOINT ASSEMBLY
Filed Aug. 16, 1950
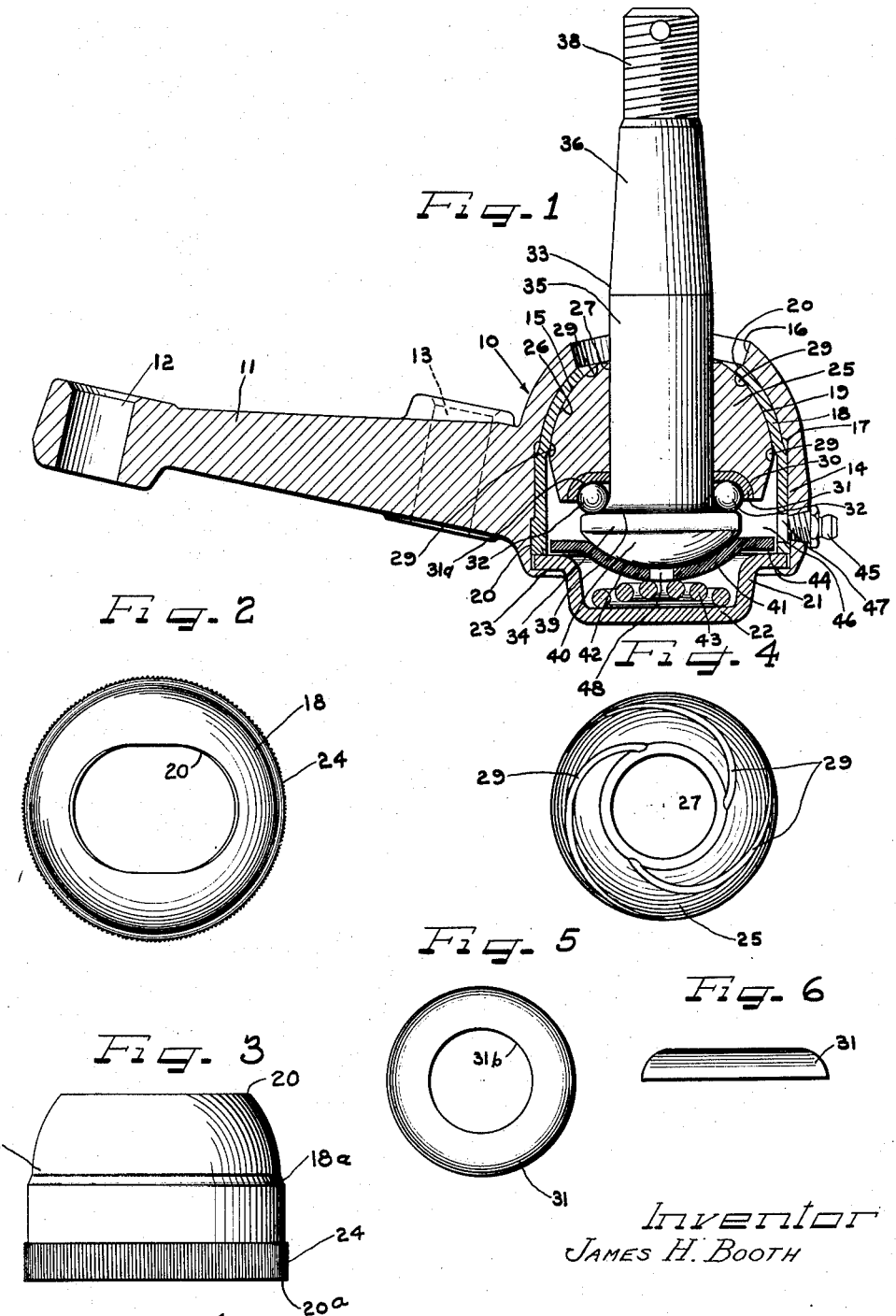
Inventor
JAMES H. BOOTH

United States Patent Office 2,809,855
Patented Oct. 15, 1957

2,809,855

JOINT ASSEMBLY

James H. Booth, Venice Township, Mich., assignor to Thompson Products, Inc., Cleveland, Ohio, a corporation of Ohio Application August 16, 1950, Serial No. 179,858

9 Claims. (Cl. 287—90)

This invention relates to joint structure having separate bearing portions for tilting movement of a joint stud relative to its housing and for rotation of the stud about its own axis.

More specifically, this invention relates to a joint structure which is adapted to withstand high axial loads tending to pull the stud out of the housing and in which the stud is universally rockable in the housing and rotatable about its own axis on anti-friction thrust bearings.

According to this invention, a body member or housing has a substantially cylindrical chamber provided near one end with a segmental spherical bearing surface terminating in a reduced diameter opening. An annular bearing member having a relatively hard segmental spherical bearing surface is tiltably mounted in a thin, hardened bearing insert or shell which is disposed in complementary relationship within the cylindrical chamber and the segmental spherical surface provided in the housing. A hardened ball bearing race of sheet material is fixedly disposed in a mating socket at the end of the annular bearing member opposite to the segmental spherical bearing surface thereon. A plurality of hardened steel ball bearings are disposed within the race and are retained therein by the hardened head of a stud which has a mating ball bearing race about the shank side of the head, and which has its shank extending through the cylindrical opening through the annular bearing member in slidable complementary relationship therewith.

The headed end of the stud has a segmental spherical bearing surface thereon disposed in complementary relationship against a spherical impression formed in a bearing seat member of hardened sheet material. A closure is provided at the open end of the cylindrical chamber and a compression spring is disposed between the closure and the bearing seat in order to maintain proper bearing contact between the various mating bearing surfaces. Means are provided for lubrication of the bearing assembly, which means include spiral grooving on the segmental spherical surface of the annular bearing members.

The joints of the present invention are especially usable in mass produced articles of manufacture, such as automobiles, trucks and the like, where a long wearing joint which can resist high loads is required. Because of the insert method of obtaining the required hardness for the bearing surfaces the ease of manufacture of the joint assembly is greatly enhanced, and the resulting joint assembly is not only considerably less expensive, but is of substantially better quality than joints embodying hardened bearing surfaces formed in the material of the housing.

It is, therefore, an important object of the present invention to provide a joint assembly in which the housing contains hardened insert bearing surfaces for universal tilting of the stud and for rotation of the stud about its own axis.

Another object of this invention is to provide a ball joint in which the stud may be subjected to high axial loads, which loads are transmitted from the stud into a hardened race insert of anti-friction thrust bearings.

A further object of this invention is to provide a ball joint assembly which is capable of withstanding high loads, but which contains means for lubrication of the universal bearing surfaces regardless of the magnitude of the load applied or of relative movement therebetween.

A still further object of this invention is to provide an improved stud joint in which the shank of the stud is rotatably mounted on anti-friction thrust bearings in a tiltable spherical bearing.

Other and further objects and features of this invention will be apparent to those skilled in the art from the following detailed description of the annexed sheet of drawings, which by way of preferred example, illustrates one embodiment of the invention.

On the drawings:

Figure 1 is a vertical sectional view of an assembled joint according to the present invention with parts in elevation;

Figure 2 is a top elevational view of the hardened segmental spherical bearing insert shell or socket;

Figure 3 is a side elevational view of the socket insert shown in Figure 2;

Figure 4 is a top elevational view of the segmental spherical bearing member or ball showing the lubricant channels along the spherical surface thereof;

Figure 5 is a top elevational view of the hardened ball bearing insert or race; and Figure 6 is a side elevational view of the ball bearing race shown in Figure 5.

As shown on the drawings:

In Figure 1 the reference numeral 10 indicates generally an end socket housing having a laterally extending arm 11 integral therewith and adapted to be anchored to a mounting bracket, or the like, by means of bolts or pins (not shown) inserted through holes 12 and 13 formed through the arm. The socket of the housing 10, which is in the form of an inverted cup, has a substantially cylindrical portion 14 inwardly of its open end and a segmental spherical portion 15 converging to a reduced diameter opening 16. The diameter of the cylindrical portion 14 is slightly greater than the diameter of the segmental spherical portion 15 and hence there is an annular shoulder 17 formed therebetween.

Disposed in complementary relationship within the cylindrical portion 14 and the segmental spherical portion 15 is a ball socket shell or insert 18 having a segmental spherical bearing surface 19 near one end thereof and terminating in a reduced diameter opening 20 of comparable size and located coaxially with the opening 16 through the housing 10. At its other end the socket insert 18 has an annular rib 20a ending at a predetermined location within the cylindrical portion 14. For providing a close mating contact between the outer surface of the insert 18 and the inner surface within the housing 10 the insert has a cylindrical portion of slightly greater diameter than the segmental spherical portion. The two portions are joined at a shoulder 18a.

The bottom end of the housing 10 is closed by a cap 21 having a downwardly dished central portion 22. The outer margin of the cap 21 is disposed within the end of the cylindrical portion 14 in continuous peripheral abutting contact with the annular rib 20a at one end of the socket insert 18. The cap 21 is held in fixed position by peening or spinning the end of the housing over the peripheral edge of the cap as indicated at 23.

As seen in Figures 2 and 3, the outer periphery of the bottom portion of the socket insert 18 is provided with straight knurling 24 therearound. The knurling 24 is provided for the purpose of insuring a fixed non-rotating connection between the socket insert and the interior of the housing 10. Thus, when the socket insert 18 is pressed into place within the housing 10, as seen in Fig. 1, the insert becomes a fixed inner lining within the housing.

In order to insure a long wearing bearing surface, the socket insert 18 is pre-hardened to a relatively high degree of surface hardness such as a minimum of 62 Rockwell "C." Since the hardened inner bearing surface is provided by the socket insert 18, the housing 10 need not be specially heat treated and hence will retain the required toughness to resist fracture under high shock loading. Thus, there is provided a relatively soft, ductile socket body having a hard inner bearing surface, the same having been produced without the use of expensive steels and without the necessity of special heat-treating processes, such as normalizing, toughening and then induction hardening of the inside spherical surface only. In addition, the use of such a socket insert precludes the necessity of machining a shoulder within one end of the housing in order to provide for correct positioning of the cap 21 in order to maintain the various internal parts of the joint assembly in proper relationship.

A ball member 25 having a segmental spherical bearing surface 26 and an inner cylindrical bore 27 therethrough is disposed with said bearing surface in conforming bearing relationship within the hardened segmental spherical bearing surface 19 of the socket insert 18. It should be noted that assembly of the bearing member 25 within the socket insert 18 is simplified because of the slightly larger diameter of the cylindrical portion of the insert.

A plurality of spiral grooves 29, serving as lubricant channels, are provided in the spherical surface of the bearing member 25 and extend across said surface. The spherical surface 26 is hardened to a value substantially equal to the hardness of the mating bearing surface 19.

An annular recess 30 is formed at the lower end of the ball member 25 about one end of the cylindrical bore 27. Disposed in fixed mating relationship within the recess 30 is a ball bearing insert or race 31. The race 31 is of sheet material heat treated to the required hardness, such as a minimum of 62 Rockwell "C." A plurality of hardened ball bearings 32 are disposed in ball bearing relationship about a bearing recess or ball bearing race 31a in the lower surface of the ball bearing race 31.

Since the ball bearing race 31 is subjected to a greater unit stress than the spherical bearing surface 26 of the bearing member 25, the depth of surface hardness required for the bearing surface 26 is considerably less than that required for the ball bearing race surface 31a. Therefore, if the ball bearing insert 31 were not utilized, the bearing member 25 would have to be made of a more expensive grade of steel and a considerably longer surface hardening time cycle would be necessary in order to provide the required depth of hardness for the ball bearing race provided therein. Hence, the use of the ball bearing insert 31 provides a considerable saving in both time and expense.

A stud 33 having a head 34 and an adjacent cylindrical shank portion 35 is disposed with the head within the housing 10. The cylindrical shank extends in rotatable relationship through the cylindrical bore 27 of the ball member 25 and through a circular aperture 31b, substantially equal in diameter to the bore 27, formed through the ball bearing race 31. Adjacent the cylindrical portion 35 is an integral tapered shank portion 36, adapted to be held in complementary relationship within a mating tapered hole in a connecting member (not shown). The upper end of the shank is provided with an externally threaded portion 38, adapted to receive a nut (not shown).

The upper surface of the stud head 34 provides a ball bearing race 39 cooperating with the bearing recess 31a in the ball bearing insert 31 to retain the ball bearings 32 therebetween. The ball bearing race 39 is surface hardened to a value comparable to the hardness of the insert 31. Thus, a long wearing anti-friction thrust bearing is provided between the stud 33 and the bearing member 25 in order to absorb high axial loads without undue wear and without undesirable friction therebetween.

The lower end of the stud head 34 is provided with a spherical bearing surface 40 having a spherical center at substantially the same point as the spherical center of the spherical bearing surface 26 on the bearing member 25 when the stud is in proper assembled relationship with the bearing member. Cooperating with the stud head 34 is a bearing seat 41 which has a segmental spherical surface 42. A coil compression spring 43 is disposed between the dished portion 22 of the cap 21 and the seat 41 to urge the seat into bearing relationship with the spherical surface 40 on the stud head 34. With the parts thus held in proper bearing relationship a slight clearance, shown at 44, is provided between the outer peripheral portion of the bearing seat 41 and the cap 21 in order to allow for manufacturing tolerances. The spring 43 also acts to automatically take up whatever wear may occur between the various mating bearing surfaces within the housing 10, thereby holding all of the mating bearing surfaces in proper bearing relationship.

To allow the introduction of lubricant into the interior of the housing, a lubricant fitting 45 is fixedly disposed in a hole through the wall of the cylindrical socket portion 14. The lubricant fitting 45 communicates with an open chamber 46 within the housing 10 through an aperture 47 formed through the wall of the socket insert 18 adjacent the lubricant fitting. Lubricant forced into the chamber 46 through the fitting 45 and the aperture 47 is forced through the lubricant channels 29 along the spherical surface of the bearing member 25 to provide proper lubrication between this surface and the mating segmental spherical surface 19. Lubrication of the ball bearings 32 and the ball bearing races 31a and 40 is accomplished through the spaces between the balls. The mating spherical bearing surfaces 42 and 40 are lubricated by gravity feeding from the chamber 46. Communication between the chamber 46 and the space contained in the recessed central portion 22 of the cap 21 is afforded through the clearance space 44 and through an aperture 48 formed in the bearing seat 41 at the center thereof and between the mating bearing surfaces.

From the above description it should be understood that this invention provides a joint structure designed for long wear under high load conditions in which a hardened socket insert is pressed into a tough and non-brittle housing for long wear and high load capacity without danger of fracture. A mating segmental spherical ball member is provided for universal tilting of a stud journaled therein. High load capacity and long wear resistance is obtained between the ball member and the stud for rotation of the stud about its own axis by means functioning separately from the universal tilting bearing surfaces. Such means comprise an anti-friction thrust bearing embodying a hardened race member pressed into a mating recess at one end of the ball member.

The various mating bearing surfaces are automatically held in proper bearing relation by means of a compression spring which urges a bearing seat against the spherical bearing surface at the end of the stud. Proper lubrication of the ball member against its mating bearing surface is obtained by means of spiral lubricant grooves formed along the spherical bearing surface of the ball member and through which lubricant is forced. The hardened socket insert is prevented from rotation within the housing by means of knurling about a portion of its outer surface. A peripheral lip at one end of the socket insert acts to properly space a cap which is retained thereagainst for closing the open end of the housing.

It will be understood that modifications and variations may be effected without departing from the scope of the novel concepts of the present invention.

I claim as my invention:

1. In a joint assembly, a ball member having a cylindrical bore and an annular recess about one end thereof, a stud having a shank rotatably received by said bore and having a head providing an annular race confronting said annular recess, a hardened annular insert in said recess forming a second race, and ball bearings confined between said races.

2. A joint comprising a housing having an inner substantially cylindrical portion therein and a segmental spherical bearing surface at one end thereof terminating in a reduced opening, a spherical bearing member disposed in bearing relationship within said housing against said segmental spherical surface, said bearing member having a cylindrical bore therethrough with an annular recess formed about said bore at one end of said member, a stud rotatably disposed within said bearing member and having a shank extending through said bore and out of the reduced opening in said housing, said stud having a head at one end defining a ball bearing race adjacent the head around the stud shank, a hardened ball bearing race insert disposed in fixed mating relationship within the recess formed in said bearing member, a plurality of ball bearings disposed between said race insert and the race on said stud, and means for retaining said bearing member in rockable bearing relation within said housing and for retaining said stud in rotatable ball bearing relation in said bearing member.

3. In a ball joint adapted for pivotally connecting two members in limited universal relationship under highly loaded conditions, a housing, a hardened metal socket insert fixedly secured therein, a bearing member having a hardened segmental spherical surface rockably disposed in spherical bearing relation within said socket insert, a stud having an end portion rotatably disposed in said bearing member and having a shank extending out of said housing, said bearing member having an annular recess formed about said stud shank, an anti-friction bearing disposed about the terminal section of said stud end portion, said anti-friction bearing having a hardened race of sheet metal fixedly disposed in conforming relationship in said recess formed in said bearing member.

4. In a ball joint adapted for pivotally connecting two members in limited universal relationship under highly loaded conditions, a housing having a hardened metal socket insert fixedly secured therein, said socket insert having a knurled portion about its outer periphery in engagement with said housing for preventing rotation of the insert within the housing, a bearing member having a hardened segmental spherical surface rockably disposed in spherical bearing relation within said socket insert, a stud having one end portion rotatably disposed in said bearing member and having a shank extending out of said housing, said bearing member having an annular recess formed about said stud shank, an anti-friction bearing disposed about the terminal section of said end portion, said anti-friction bearing having a hardened race of sheet metal disposed in fixed mating relationship within said recess formed in said bearing member, and means for retaining said bearing member in rockable bearing relation within said socket insert and for retaining said stud in rotatable anti-friction bearing relation to said bearing.

5. A joint comprising a housing having an inner substantially cylindrical portion therein and a segmental spherical surface at one end thereof terminating in a reduced opening, a hardened socket insert disposed within said housing in fixed mating relationship with said cylindrical and segmental spherical surfaces therein, said insert having a knurled portion about its outer periphery in engagement with the wall of said cylindrical portion to prevent rotation of the insert within the housing, a spherical bearing member disposed in conforming bearing relationship within said socket insert, said bearing member having a cylindrical bore therethrough with an annular recess formed about said bore at one end of said member, a stud rotatably disposed within said bearing member and having a shank extending through said bore and out of the reduced opening in said housing, said stud having a head at one end defining a ball bearing race adjacent the head around the stud shank, a hardened ball bearing race insert disposed in fixed mating relationship within the recess formed in said bearing member, a plurality of ball bearings disposed between said race insert and the ball bearing race on said stud, said stud head having a spherical end face, a sheet metal bearing seat disposed in said housing and having a spherical surface therein receiving said spherical end face in conforming relationship therewith, a cap fixedly attached at the end of said housing opposite to said reduced opening and having an outer peripheral portion abutting the end of said socket insert, and a compression spring disposed between said cap and said bearing seat to automatically urge all mating bearing surfaces into bearing relation.

6. A joint comprising a housing having an inner substantially cylindrical portion therein and a segmental spherical surface at one end thereof terminating in a reduced opening, a hardened socket insert disposed within said housing in fixed mating relationship with said cylindrical and segmental spherical impression surfaces therein, a spherical bearing member disposed in conforming bearing relationship within said socket insert, said bearing member having a cylindrical bore therethrough with an annular recess formed about said bore at one end of said member, a stud rotatably disposed within said bearing member and having a shank extending through the bore and out of the reduced opening in said housing, said stud having a head at one end defining a ball bearing race adjacent the head around the stud shank, a hardened ball bearing race insert disposed in fixed mating relationship within the recess formed in said bearing member, a plurality of ball bearings disposed between said race insert and the race on said stud, the spherical bearing surface of said bearing member having a plurality of spiral grooves therein, means for introducing lubricant into said housing for forcing the lubricant into the spiral grooves along the surface of said bearing member for lubricating said surface and for lubricating said other mating bearing surfaces, and means for retaining said bearing member in rockable bearing relation within said socket insert and for retaining said stud in rotatable ball bearing relation in said bearing member.

7. In a joint assembly, a socket housing having means defining an internal bearing surface, a rockable bearing member having a surface portion conforming to said bearing surface and having a cylindrical bore therethrough, a stud having a cylindrical shank journaled in said bore and having an enlarged head portion, means acting on said head portion to urge said bearing member into engagement with said bearing surface, and thrust bearing means between said bearing member and said stud including a hardened insert in said bearing member.

8. In a joint assembly, a ball member having a cylindrical bore and an annular recess about one end thereof, a stud having a shank rotatably received by said bore and having a head providing an annular race confronting said annular recess, a hardened annular insert in said recess forming a second race, and bearings confined between said races.

9. In a joint assembly, a cup-shaped socket housing having an open end with an internal cylindrical wall portion adjacent said open end and a segmental spherical wall portion opposite said open end, the diameter of said cylindrical wall portion being slightly greater than the maximum diameter of said spherical portion to define a shoulder in said housing facing said open end, a hardened socket insert in said socket housing having cylindrical and spherical portions in complementary relation to said cylindrical and spherical wall portions of said housing, the cylindrical portion of said insert having a diameter slightly greater than the diameter of the spherical portion thereof to define a shoulder engaging said shoulder in said housing, a closure member at said open end of said housing engaging said insert, said housing being deformed to hold said closure member and said insert in said housing with said shoulder of said insert and said shoulder of said housing being tightly engaged to prevent movement of said insert away from said open end of said housing, and relatively rotatable bearing members assembled within said housing and including a member having a surface conforming to said segmental spherical wall portion and tiltable with respect thereto.

References Cited in the file of this patent

UNITED STATES PATENTS

| Number | Name | Date |
|---|---|---|
| 547,400 | Palmiter | Oct. 1, 1895 |
| 1,132,759 | Bache | Mar. 23, 1915 |
| 1,465,140 | Lumsden | Aug. 14, 1923 |
| 1,555,214 | Johnson | Sept. 29, 1925 |
| 1,796,142 | Crawford | Mar. 10, 1931 |
| 1,829,306 | Sneed | Oct. 27, 1931 |
| 2,026,338 | Zerk | Dec. 31, 1935 |
| 2,147,815 | Hufferd et al. | Feb. 21, 1939 |
| 2,167,174 | Flumerfelt | July 25, 1939 |
| 2,206,972 | Niles | July 9, 1940 |
| 2,291,161 | Katcher | July 28, 1942 |
| 2,396,137 | Venditty et al. | Mar. 5, 1946 |
| 2,494,739 | Booth | Jan. 17, 1950 |
| 2,516,688 | Flumerfelt | July 25, 1950 |

FOREIGN PATENTS

| Number | Country | Date |
|---|---|---|
| 508,890 | Great Britain | July 7, 1939 |